(No Model.)
S. B. BATTEY.
MOTOR FOR BICYCLES.
No. 552,312. Patented Dec. 31, 1895.
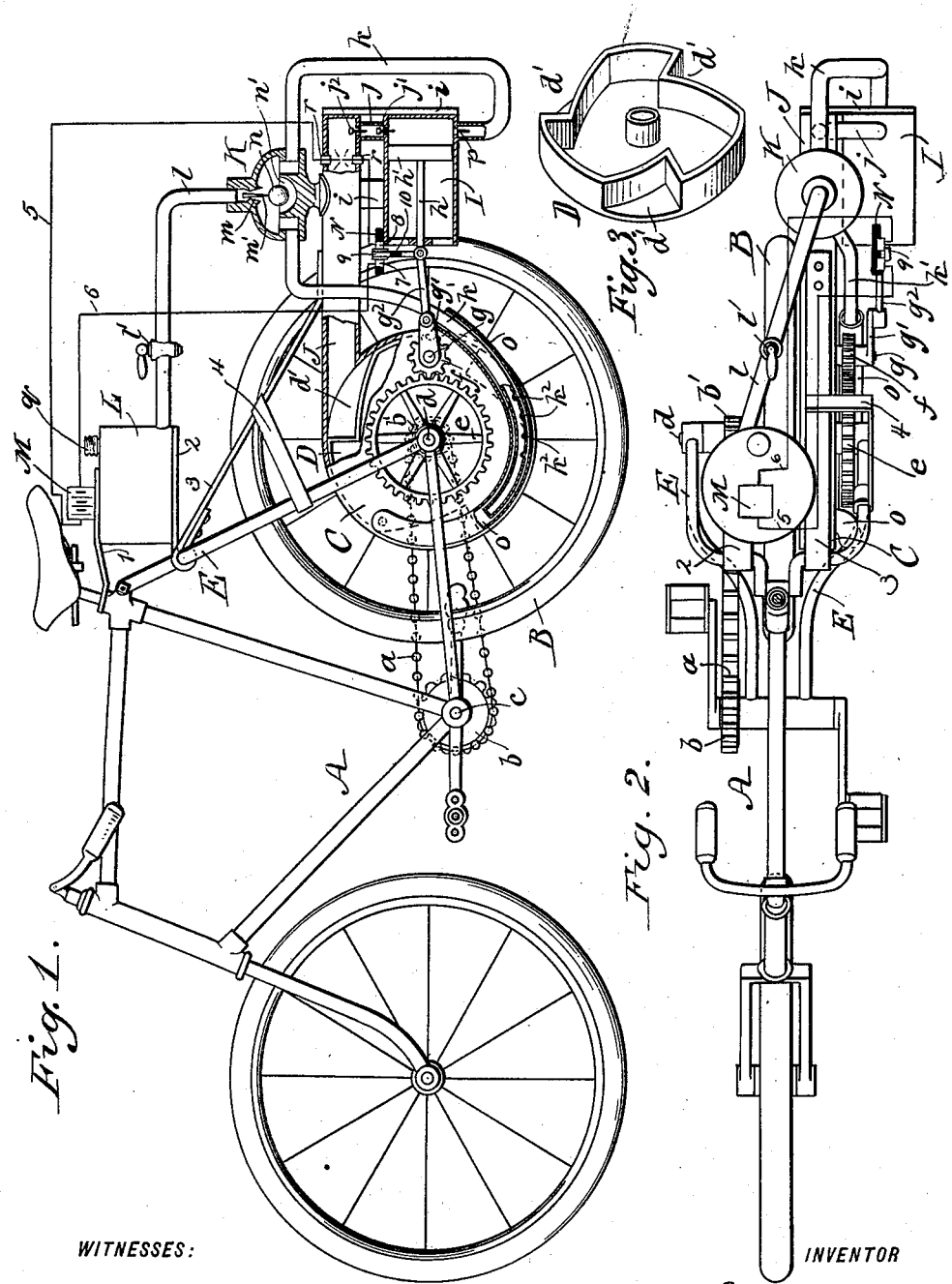
WITNESSES:
Ruben B. Caffray.
M. J. McClain.
INVENTOR
Sumter B. Battey
BY
Clark, Reemer & Co.
ATTORNEY

UNITED STATES PATENT OFFICE.

SUMTER B. BATTEY, OF NEW YORK, N. Y.

MOTOR FOR BICYCLES.

SPECIFICATION forming part of Letters Patent No. 552,312, dated December 31, 1895.

Application filed April 19, 1895. Serial No. 546,380. (No model.)

*To all whom it may concern:*

Be it known that I, SUMTER B. BATTEY, a citizen of the United States, and a resident of the city, county, and State of New York, have invented certain new and useful Improvements in Motors for Bicycles or other Vehicles, of which the following is a specification, reference being had to the accompanying drawings, forming a part thereof, in which similar letters and figures of reference indicate corresponding parts.

My invention relates to improvements in bicycles or other vehicles, and has for its object to produce an efficient and inexpensive attachment adapted to supply motive power to vehicles, whereby they may be propelled without undue exertion on the part of the operator or rider thereof.

The operation and construction of my invention will be hereinafter fully described and claimed, and illustrated in the accompanying drawings, in which—

Figure 1 is a side elevation of a bicycle having my improved attachment secured thereto; Fig. 2, a plan view of the same, and Fig. 3 a detailed perspective view of a portion thereof.

In the practice of my invention, as illustrated in the accompanying drawings, an ordinary bicycle A is employed. This said bicycle is supplied with the usual chain $a$ and sprocket-wheels $b$ and $b'$ common to all modern bicycles, the sprocket-wheel $b$ being attached to the pedal-spindle $c$ and the sprocket-wheel $b'$ to the rear shaft or axle $d$ of the said bicycle A in the usual manner at one side of the rear traction-wheel B, which is also attached to the said shaft $d$. At the end of the shaft $d$, opposite to the sprocket-wheel $b'$, and on the other side of the wheel B of the bicycle A, is attached a pinion $e$, adapted to gear with a driving-pinion $f$, which is of less diameter than the aforesaid pinion $e$. This latter pinion is journaled to a stud $g$ forming part of a casing or housing C which surrounds a revoluble cylinder D, which said cylinder is secured to the shaft $d$ of the wheel B. The said cylinder D has pockets or recesses $d'$ formed in its outer periphery adapted to receive a charge of vapor, whereby it may be revolved, which will be hereinafter fully described.

The small stud $g$ above referred to has attached to it a crank-arm $g'$, to the outer end of which is pivoted a connecting-rod $g^2$, which connects with a piston-rod $h$ of a piston $h'$, adapted to oscillate within a cylinder I, which is attached by braces $i$ to another cylinder J. These two cylinders must be of a size to hold approximately the same number of cubic feet of gas or vapor adapted to be employed in the operation of the device, which will be hereinafter described. Connecting these two cylinders at a point near their outer ends I employ a tubular channel $j$, which is supplied with valves $j'$ and $j^2$, adapted to automatically open to exhaust vapor from the cylinder I and to close when it is taking in a supply.

Communicating with the cylinder I at a point approximately opposite to the outlet-tube $j$ is an inlet-tube $k$, which leads into one side of a vaporizer K. The said vaporizer K communicates with a supply-pipe $l$ of a tank L, adapted to contain gasoline, naphtha, petroleum, or other vaporizable substance, and the supply of said substance to the vaporizer is regulated by a stop-cock $l'$ attached to the said pipe $l$. The vaporizer K has an inlet $m$ in its upper portion, which is partially closed by a pin $m'$, which rests upon a spherical distributer $n$, adapted to hold portions of the material to be vaporized. Under the said sphere is a cup-shaped receptacle $n'$, which will retain any superfluous liquid and prevent the same from being drawn into the cylinder I through the tube $k$. Leading into the vaporizer K at a point opposite to the outlet end of the tube $k$ is a tube $k'$, which telescopes with a tube $o$ of a larger diameter. This latter tube pierces one of the walls of the casing C and receives a supply of expanded and heated air from the pockets $d'$ of the cylinder D. The said tube $k'$ is punctured with apertures $k^2$, adapted to receive a supply of cold air, which mixes with the hot air discharged from the apertures $d'$ of the cylinder D before it is carried into the vaporizer K, whereby vaporization of the substance contained therein is augmented.

The supply-tube $k$ of the cylinder I is provided at its inlet with a valve $p$, adapted to be normally closed when the vapor is being expelled from said cylinder and to open when it is receiving the supply.

The reservoir or tank L above referred to can be secured to the frame E of the bicycle by suitable braces 1 and 2. The cylinder J and casing C, forming part thereof, may also be secured by suitable braces 3 and 4, but I do not confine myself to the specific means of attachment shown in the drawings. The tank L must also be provided with a screw-cap $q$, which may be removed when it is necessary to fill the same.

To complete the operative parts of my invention a battery M must be supplied. This battery can be of any suitable make or construction, and it may be secured to any desirable place upon the bicycle. It is shown in the accompanying drawings as simply resting upon the top of the tank L. The wires 5 and 6 leading from the two poles of the battery M are led into the cylinder J through insulating-plugs $r$ and brought to a point adjacent to each other in the interior of the said cylinder, whereby an arc is formed and a spark produced upon the making or breaking of the current. A circuit-making device N, comprising a piece of insulating material, which may be attached to any suitable place on the bicycle, and two contact-points 7 and 8, is let into one of the wires, whereby a normally-broken circuit is maintained. The circuit is alternately broken and completed by the forward and backward movement of a circuit-making plate 9, which is attached to the piston-rod $h$ of the piston $h'$, this said plate 9 being insulated from the piston-rod upon which it is mounted by the interposition of a piece of insulating material 10.

The operation of my invention is as follows: The tank or reservoir L being charged with a supply of suitable vaporizable material, such as gasoline, naphtha, petroleum, or other like substance, the cock $l'$ of the pipe $l$ leading from said tank is turned on sufficiently to allow a small stream of the said substance to flow into the vaporizer K, which, owing to the small inlet $m$ being partially closed by the pin $m'$, flows very slowly and diffuses over the surface of the spherical distributer $n$ and vaporizes within the chamber formed by the upper hollow portion of the vaporizer K. The bicycle is then started, the operator pedaling in the ordinary manner until the rotary motion imparted to the sprocket-wheels $b$ and $b'$ and thence to the cylinder D and pinions $e$ and $f$ imparts a continuous oscillating movement to the piston $h'$ of the cylinder I. This said piston as it moves back and forth will alternately take in a supply of vapor from the vaporizer K through the medium of the pipe $k$ and discharge the same into the cylinder J through the channel or tube $j$. Immediately upon the completion of the inward stroke of the piston $h'$ and when the supply of vapor contained within the cylinder I is exhausted into the cylinder J an electrical contact is made and a spark produced within the said cylinder J, whereby the vapor is exploded and its expansive force being exerted upon the driving-cylinder D through the medium of one of the pockets $d'$ thereof. This said pocket is then exhausted through the pipe $o$ and thence through the openings $h^2$ in the pipe $h'$ back into the vaporizer K. The hot air in transit from the pocket $d'$ of the cylinder D mixes with a supply of cold air which is drawn in through the open top of the pipe $o$. This mixture of hot and cold air assists vaporization of the substance contained within the vaporizer K and maintains a continuous supply of vapor to the cylinder I. It will be readily seen from the above description that a continuous rotary motion is supplied to the cylinder D and thence to the wheel B of the bicycle, whereby an even speed can be maintained until the supply of vaporizable material is exhausted, or the operator can stop at his discretion by applying pressure to the pedals in the manner commonly resorted to in the use of all bicycles. It is further pointed out that the pinion $e$ is of a diameter equaling three times that of the pinion $f$, and this will give three revolutions of the pinion $f$ to one of the pinion $e$. Thereby a constant supply of vapor is infused into the explosive chamber of the cylinder J and continuous and even rotary motion of the motor is maintained.

I do not confine myself to the specific details of mechanical construction shown and described above, as it will be obvious that many modifications of construction come within the scope of my invention. Neither do I confine myself to the use of a bicycle, as it is plainly evident that my improved motor can be successfully used in connection with vehicles of any kind whatsoever.

Having thus fully described my invention, what I claim as new, and desire to secure by Letters Patent, is—

1. A rotary motor for bicycles or other vehicles, comprising a revoluble cylinder having pockets or recesses therein, a telescopic exhaust pipe leading therefrom to a vaporizer, a housing surrounding the said cylinder, an explosion chamber communicating with the said housing, a supply cylinder communicating with the explosion chamber, a vaporizer having an inlet pipe to the supply cylinder and a storage tank or reservoir adapted to contain gasoline or other vaporizable material, provided with a supply pipe communicating with the vaporizer; in combination with a pinion attached to the axle of a bicycle or other vehicle and a pinion of smaller diameter gearing therewith, adapted to supply oscillatory motion to a piston moving within the supply cylinder; and a circuit-making device adapted to automatically produce a spark within the explosion chamber, whereby the revoluble cylinder is given continuous rotary motion, substantially as shown and described.

2. In a bicycle or other vehicle, the combination of a revoluble cylinder adapted to supply rotary motion to a wheel or wheels thereof, a housing or casing surrounding the said cylinder, a telescopic exhaust pipe leading therefrom into a vaporizer, and an explosion chamber communicating with said housing, a supply cylinder provided with an oscillating piston adapted to force vapor into the explosion chamber, a vaporizer interposed between the supply cylinder and a storage tank adapted to contain gasoline or other like substance, and feed the same through the vaporizer, and thence to the supply cylinder, combined with a pinion attached to the axle of the bicycle or other vehicle, which said pinion gears with a pinion of smaller diameter, to which are attached a crank arm and connecting rod adapted to impart oscillatory motion to the piston contained within the supply cylinder, whereby vapor is forced through a communicating pipe supplied with valves into the explosion chamber and exploded by means of an electric spark automatically produced by a circuit making device electrically connected to a suitable battery, substantially as shown and described.

In testimony that I claim the foregoing as my invention I have signed my name, in presence of two witnesses, this 18th day of April, 1895.

SUMTER B. BATTEY.

Witnesses:
  CHAS. B. LOTHROP,
  RUBEN B. CAFFRAY.